United States Patent [19]

Takemae et al.

[11] Patent Number: 4,756,473
[45] Date of Patent: Jul. 12, 1988

[54] COOLING METHOD CONTROL SYSTEM FOR ELECTRONIC APPARATUS

[75] Inventors: Motohiro Takemae, Fujisawa; Tsuguo Okada; Haruhiko Yamamoto, both of Yokohama, all of Japan

[73] Assignee: Fujitsu Limited, Kawasaki, Japan

[21] Appl. No.: 928,206

[22] PCT Filed: Feb. 12, 1986

[86] PCT No.: PCT/JP86/00058

§ 371 Date: Oct. 16, 1986

§ 102(e) Date: Oct. 16, 1986

[87] PCT Pub. No.: WO86/05013

PCT Pub. Date: Aug. 28, 1986

[30] Foreign Application Priority Data

Feb. 22, 1985 [JP] Japan .................................. 60-035053

[51] Int. Cl.⁴ ............................................... F24F 7/00
[52] U.S. Cl. .................................. 236/49; 236/1 EA; 361/384
[58] Field of Search ........................ 236/49 D, 1 EA; 361/384, 379; 62/183, 184; 165/39; 307/39

[56] References Cited

U.S. PATENT DOCUMENTS

| | | | |
|---|---|---|---|
| 4,085,594 | 4/1978 | Mayer | 236/1 EA |
| 4,126,269 | 11/1978 | Bruges | 236/49 D |
| 4,628,701 | 12/1986 | Phillips et al. | 62/184 |

FOREIGN PATENT DOCUMENTS 118111 9/1980 Japan ................................ 236/49 D Primary Examiner—William E. Wayner
Attorney, Agent, or Firm—Staas & Halsey

[57] ABSTRACT

A cooling system for an electronic apparatus which cools the electronic apparatus using a plurality of cooling fans and controls the rotational speed of the cooling fans in accordance with the temperature of apparatus to be cooled or the temperature of the inlet air or the air to be exhausted. Operation of the electronic apparatus may be continued with high reliability even when one or more fans fail by using simplified circuitry which causes other normal cooling fans to operate at full speed.

4 Claims, 3 Drawing Sheets

COOLING METHOD CONTROL SYSTEM FOR ELECTRONIC APPARATUS

DESCRIPTION

1. Technical Field

The present invention relates to a cooling-arrangement which cools the interior of an electronic apparatus such as an information processing apparatus, etc. with a plurality of cooling fans, and particularly to an improvement in the control system for such cooling arrangement which controls the rotational speed of each cooling fan in accordance with the heat generated by the electronic apparatus.

2. Background Art

Heat generated within an electronic apparatus has a very considerable effect on components of electronic circuits and particularly, as is well known, such heat results not only in deterioration of performance but also in breakdown of semiconductor elements in semiconductor integrated circuits including semiconductor elements which determine the performance of electronic apparatus.

In general, electronic apparatus is cooled by exhausting the heat generated to the outside of apparatus with a cooling fan or by supplying external air to the apparatus to thereby cool the inside of the apparatus.

However, if the temperature conditions within the apparatus depend on the normal rotation of such cooling fans, and if the cooling fans should fail and stop its rotation, the internal temperature of the apparatus will rise quickly resulting in breakdown of semiconductor elements, etc.

Accordingly, a plurality of cooling fans are usually provided in order to avoid quick temperature rise within the apparatus due to failure of one or more cooling fans and the apparatus is designed so that the power supply is disrupted and the apparatus stops operating before the interior reaches a risky temperature.

If the power supply to the apparatus is disrupted in this manner, a considerable amount of operation time is lost pending restart of operation by resetting the power switch.

Therefore, it is proposed that the electronic apparatus cooling system be arranged so as to safely minimize any disruption of the supply of electrical power in the event of failure of one or more cooling fans.

FIG. 1 illustrates a cooling system control circuit of a typical prior art electronic apparatus designated by the reference numeral 1.

For cooling purposes, heat generated within the apparatus is exhausted by a plurality of cooling fans 2. Each cooling fan 2 is provided, for example, with a wind sensor 3 which senses flow of air or ventilation. Each sensor 3 is connected to a failure detection circuit 4.

The prior art wind sensor 3 typically included a pair of heaters and a heat sensible element. When the fan rotated normally, thus assuring ventilation, the heat generated by the heater was always exhausted. But if ventilation was lowered, heat generated by the heater accumulated causing a change in a signal issued by the heat sensible element.

If the cooling fan 2 has lost the capability of ventilation, for example, due to overheating of the fan motor or entry of foreign matter into the rotatable portion, or if ventilation capability was simply reduced, the failure detection circuit 4 detected the change in the signal sent by the wind sensor 3.

The failure detection circuit 4 displayed a warning of failure of a cooling fan at the monitor board 5 and in the meanwhile a power supply OFF signal was sent to the power supply control circuit 7 after a predetermined period by way of a delay circuit 6.

Within this predetermined setting period, necessary data in the apparatus is saved and the power supply to the apparatus is turned OFF with the power OFF signal, thus disrupting the operation of the apparatus. Since the apparatus now no longer generates heat it is protected from damage.

As described above, if the cooling fan fails completely, the apparatus is protected from damage but it is a substantial shortcoming that the operation of apparatus is inevitably disrupted. However, the accidental stoppage of a cooling fan, for example, among a plurality of cooling fans, is an assumable failure to be anticipated and provided for in the design of electronic apparatus which must operate continously for a long period.

Since the temperature within the apparatus is naturally influenced by external temperatures, the number of cooling fans to be used must be determined considering not only the possibility of stoppage of operation due to fan failure, but also the environmental temperature of apparatus. Thus, cooling fans are generally operated with an excessive ventilation capability to provide a sufficient safety factor.

If the external temperature is sufficiently low, ventilation is carried out uselessly, generating problems of excessive power consumption, curtailment of the operating life of the motor and bearings, and noise, etc.

The idea that the rotational speed of the cooling fans should be controlled to a minimum value in accordance with detected load condition or temperature in the electronic apparatus has also been proposed (for example, Laid-open Pat. Nos. 58-186998, 59-55099, etc). However, if one or more cooling fans fail, the same procedures are required and therefore operation of the apparatus must be stopped.

DISCLOSURE OF INVENTION

It is an object of the present invention to eliminate the problems described above. In order to attain this objective, the present invention provides a cooling control system for electronic apparatus wherein the rotational speed of the cooling fans is reduced so as to conduct the ventilation using minimal ventilation capability during normal operation by controlling the rotational speed of the cooling fans, or wherein all the cooling fans except for a defective cooling fan are caused to rotate at full speed if a specified number of cooling fans, for example, only one cooling fan fails, or wherein the power supply to the apparatus as a whole is turned OFF if a number of cooling fans over the specified number, for example, two or more cooling fans, fail.

BEST MODE OF CARRYING OUT THE INVENTION

Figure 1:
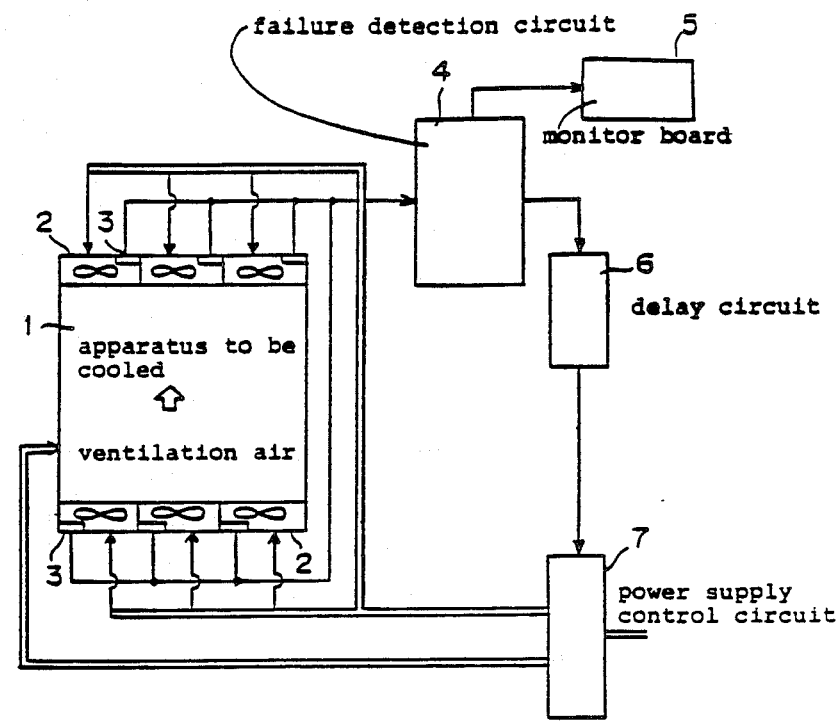
FIG. 1 is a block diagram illustrating a prior art fan control arrangement.
Figure 2:
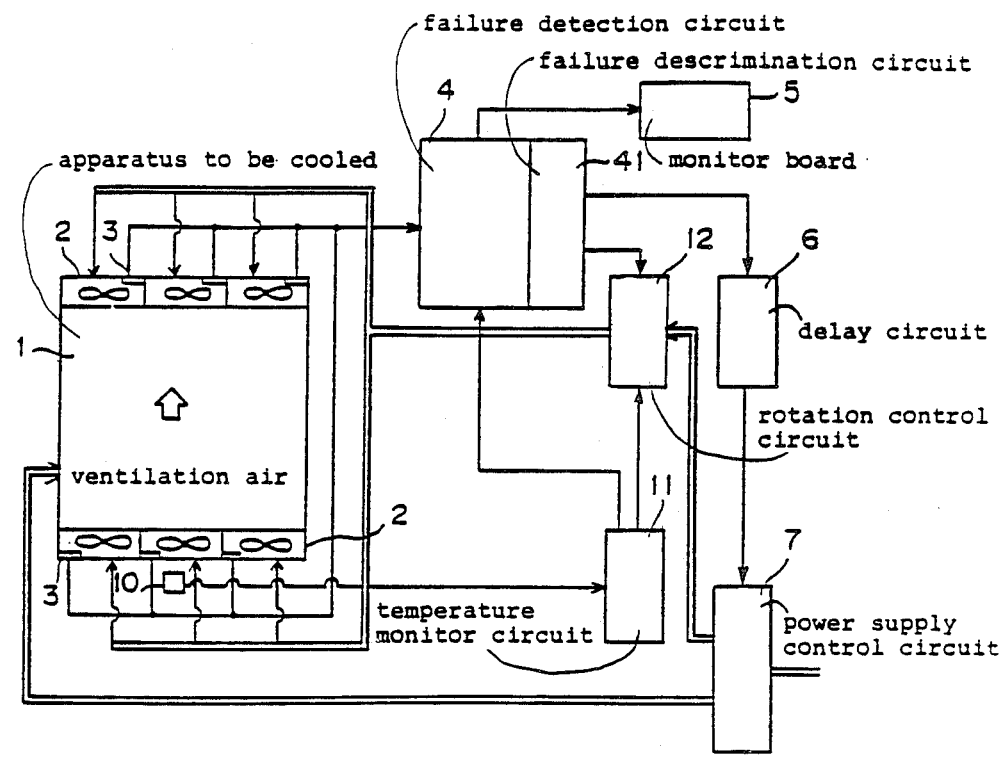
FIG. 2 is a block diagram illustrating a fan control arrangement which embodies an embodiment of the present invention.

FIG. 2 is a block diagram illustrating an embodiment of the present invention. Throughout the drawings, corresponding reference numerals are provided for like elements.

With reference to FIG. 2, under the normal operating conditions, a temperature sensor 10 provided at the external air inlet side of the apparatus senses the external air temperature and sends a corresponding signal to a rotation control circuit 12 via temperature monitor circuit 11.

The temperature signal produced by sensor 10 is used to control the rotational speed of cooling fans 2 so as to adequately ventilate the apparatus.

The temperature sensor 10 may, for example, comprise a known sensor such as a thermistor. A temperature sensor such as the sensor 10 could be provided at the ventilation air exhausting side or even within the apparatus instead of at the air inlet side as shown in the drawing. However, the illustrated embodiment, the temperature sensor 10 is provided in the air inlet side to facilitate use of the concept of controlling the rotatonal speed of cooling fans 2 as a function of the environmental temperature. Such system is sufficient when the heat generated by the apparatus 1 is constant. If the temperature sensor were to be provided at the air exhausting side, it would be impossible to accurately determine the temperature condition of the apparatus as a whole, but when the sensor is provided at the air inlet side, such problem is obviated.

If a failure occurs, a failure detection circuit 4 detects that one or more of the cooling fans 2 has quit operating, and a failure discrimination circuit 41 determines whether the number of defective cooling fans is less than, equal to or exceeds the specified number of fans.

When the number of defective cooling fans is equal or less than the specified number, the failure detection circuit 5 displays a warning for defective cooling fans on the monitor board 5.

Simultaneously, the rotation control circuit 12 turns OFF the power supply to defective cooling fans, and controls operation of the other normal cooling fans so as to provide full speed operation in order to maintain the necessary ventilation capability by compensating for the ventilation capability of the defective fans.

Accordingly, operation of the electronic apparatus can be continued.

In the case described above, it is also possible to suspend operation of the apparatus if the temperature of environmental air is sensed by the sensor 10 to be higher than a specified value such that sufficient ventilation cannot be expected even with full speed operation of the normally operating cooling fans.

Meanwhile, if the failure discriminating circuit 41 determines that the number of fans which have failed exceeds the preselected number, a power OFF signal is sent to the power supply control circuit 7 through delay circuit 6. After a predetermined period, the power supply for the apparatus as a whole is turned OFF and the operation of the apparatus is discontinued.

Figure 3:
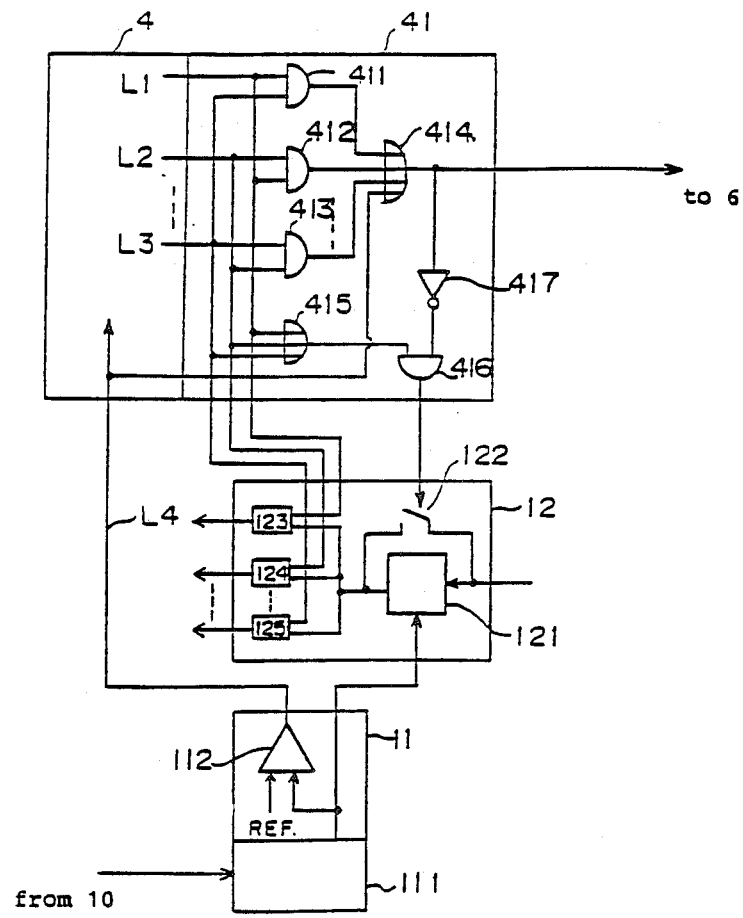
FIG. 3 is a circuit diagram illustrating details of a part of FIG. 2.

FIG. 3 is a circuit diagram illustrating the details of the failure discriminating circuit 41 and temperature monitor circuit 11 of FIG. 2. The reference symbols L1 to L3 designate failure signal leads for carrying the signals from the wind sensor 3 of the cooling fans 2. Pairs of the leads L1 to L3 are combined and connected to the inputs of each of the AND gates 411 to 413, and the outputs of the latter are connected to the input of an OR gate 414. Thus, it is possible to detect that two or more cooling fans 2 are defective and the stop signal processing is carried out through the delay circuit 6. Leads L1 to L3 are also connected to the input of the OR gate 415 and thus it can be detected that at least one cooling fan has failed. When such signal and the signal obtained by inverting the output of the OR gate 414 with an invertor 417 are input to the AND gate 416, the output from gate 416 indicates that only one cooling fan 2 is defective and this information is signalled to the rotation control circuit 12. If a given cooling fan 2 uses a DC motor, the rotation control circuit 12 therefor includes only a variable voltage generator 121, and if the given cooling fan 2 uses an AC motor, the rotation control circuit includes circuitry for frequency control or conduction phase angle control. Such circuitry are already known. In any case, if a signal is received from the failure discrimination circuit 41, the maximum rated power is applied to the cooling fan 2 in order to operate them at the full speed. For example, relay 122 is used to cause the input power to directly bypass generator 121.

The output from voltage generator 121 is distributed to the respective cooling fans through the switches 123 to 125 which can be independently turned ON and OFF and the switch of a defective cooling fan is turned OFF by the signals received through leads L1 to L3.

The temperature monitor circuit 11 comprises a receiving circuit 111 which receives a signal sent from the temperature sensor 10 and outputs a signal (for example, a voltage signal) proportional to temperature. A comparator 112 compares the output of circuit 111 with the reference value (REF) and detects that the temperature of the incoming air is higher than the specified value. The output signal of the comparator 112 is sent to the failure detection circuit 4 and is also input to the OR gate 414 of the failure discrimination circuit 41, initiation of the delay and stop cycle. In the foregoing description, a printed wiring board is assumed to be the apparatus 1 to be cooled, but recently a system for cooling printed wiring boards with cooling water and then cooling the water with air has also been employed.

The present invention can be adopted, of course, to the air-cooling system for the cooling water used for such system.

In such case, rotational speed of cooling fans may be controlled using a sensor such as the signal 10 for measuring water temperature instead of measuring the incoming air temperature.

When any one cooling fan stops and air migrates to adjacent fans through such defective fan, cooling efficiency is lowered. If desired, it is possible to provide a duct for each fan or separation plates between respective fans in order to prevent such deterioration of cooling efficiency.

As explained above, in an air cooling system which controls the rotational speed of a plurality of cooling fans in accordance with the present invention, highly-reliable cooling can be maintained using a simplified circuit which causes the remaining cooling fans to rotate at full speed if a portion of the cooling fans fail.

When the rotational speeds of air cooling fans are controlled in accordance with the temperature within the apparatus, if a portion of the fans fail, the temperature rises and the control is so carried out that the rotational speed of the fans must be increased in order to compensate for such temperature rise, even if the rotational speed of the remaining fans is not raised as in the case of the present invention as described above.

However, in such system the sensors must be provided at many points in the apparatus in order to accurately measure the temperature of the apparatus itself, because if only one sensor is provided, there is no problem when a fan near the sensor happens to fail, but when some other fan fails, the temperature rise at the area near such fan cannot be measured accurately.

Regarding this point, in the case where the temperature of the incoming air is measured as in the case of the above described embodiment of the present application, fluctuations in temperature resulting from measuring position can generally be neglected even when a given fan fails and therefore only one sensor is sufficient and cost is reduced.

Moreover, if a portion of the cooling fans fails, distribution of air flow within the apparatus will change, and therefore it is dangerous to directly and continuously adopt the logic for controlling rotational speed on the basis of the precondition of normal operation of all fans. It is possible to design a cooling system including the case where the logic of speed control is adapted to accommodate a failure of a portion of the cooling fans. But, such circuitry would be complicated, resulting in increased cost.

Therefore, it is preferred from the view point of both cost and reliability that the temperature of the incoming air is measured, and the rotational speed of the fans is controlled such that when a portion of the cooling fans fails, the remaining fans are controlled so as to rotate at full speed.

INDUSTRIAL APPLICABILITY

The present invention provides a distinctive advantage when used in connection with the air cooling systems of apparatuses such as electronic computers which are required to have high packing density and high reliability or to the air cooling systems for arrangements wherein such apparatuses are cooled for cooling such apparatus with water.

We claim:

1. A cooling control system for an electronic apparatus comprising a plurality of cooling fans for directing cooling air over an object to be cooled, temperature monitor circuit means for detecting the temperature of the incoming air or the air to be exhausted, and rotation control circuit means for controlling the rotational speed of said air cooling fans in accordance with the temperature detected by said temperature monitor circuit means, said system further comprising sensor means for sensing failures of respective ones of said cooling fans, failure discriminating circuit means for detecting from the output of the sensors that at least a specified number of the cooling fans are defective, and means for overriding the rotation control circuit means when the failure discrimination circuit means detects that the specified number of fans are defective and causing the cooling fans other than the defective fans to operate at full speed.

2. A cooling control system for an electronic apparatus as set forth in claim 1, wherein said temperature monitor circuit means measures the temperature of the incoming air and includes a comparator means for detecting that the temperature of the incoming air is higher than a specified value.

3. A cooling control system for an electronic apparatus as defined in claim 1 or claim 2, wherein is included means for suspending operation of the electronic apparatus according to predetermined procedures whenever the number of defective fans exceeds a specified number or the temperature of the inlet air is higher than a specified temperature.

4. Cooling method control system for electronic apparatus as defined in claim 2, wherein operations of electronic apparatus is suspended according to the predetermined procedures without restoring rotation control in such a case that a number of defective fans exceeds the specified number or temperature of air sucked is higher than the specified temperature.

* * * * *

UNITED STATES PATENT AND TRADEMARK OFFICE
CERTIFICATE OF CORRECTION

PATENT NO. : 4,756,473
DATED : July 12, 1988
INVENTOR(S) : Motohiro Takemae, Tsuguo Okada, Haruhiko Yamamoto It is certified that error appears in the above-identified patent and that said Letters Patent is hereby corrected as shown below:

Column 1, line 7, "cooling-arrange" should be --cooling arrange--;

line 53, before "is" insert --1--.

Signed and Sealed this

First Day of November, 1988

Attest:

DONALD J. QUIGG

Attesting Officer

Commissioner of Patents and Trademarks